(12) United States Patent
Shin (10) Patent No.: US 7,748,579 B1
(45) Date of Patent: Jul. 6, 2010

(54) APPARATUS FOR METERED DISPENSING OF PARTICULATE MATERIALS

(76) Inventor: Jai Shin, 3434 Bladensburg Rd., Brentwood, MD (US) 20722

(*) Notice: Subject to any disclaimer, the term of this patent is extended or adjusted under 35 U.S.C. 154(b) by 1122 days.

(21) Appl. No.: 11/013,420

(22) Filed: Dec. 17, 2004

(51) Int. Cl.
*G01F 11/28* (2006.01)
*B65D 47/00* (2006.01)

(52) U.S. Cl. .................. 222/450; 222/480; 222/565; 222/548; 222/444

(58) Field of Classification Search ............... 222/450, 222/451, 452, 443, 444, 544, 547, 548, 553, 222/565, 480, 129
See application file for complete search history.

(56) References Cited

U.S. PATENT DOCUMENTS

| | | | |
|---|---|---|---|
| 152,909 A | 7/1874 | McSkimin |
| 582,972 A | 5/1897 | Austin |
| 614,646 A | 11/1898 | Cloud |
| 685,988 A | 11/1901 | Holm |
| 928,052 A | 7/1909 | Hirsch |
| 1,005,130 A | 10/1911 | Andrews |
| 1,291,804 A | 1/1919 | Eckstein |
| 2,088,836 A | 8/1937 | Brown |
| 2,207,395 A | 7/1940 | Brown |
| 2,211,452 A | 8/1940 | Bowman |
| 2,315,473 A | 3/1943 | Wolcott |
| 2,385,677 A | 9/1945 | Bailey |
| 2,393,454 A | 1/1946 | Bailey |
| 2,515,735 A | 7/1950 | Saunders |
| 2,579,388 A | 12/1951 | Lowry |
| 2,636,646 A | 4/1953 | Olsen |
| 2,815,154 A | 12/1957 | Smith |
| 2,877,937 A | 3/1959 | Weir |
| 2,887,254 A | 5/1959 | Menderman |
| 2,898,010 A * | 8/1959 | Tepper | ................. 222/339 |
| 2,904,230 A | 9/1959 | Worth |
| 2,985,343 A | 5/1961 | Mask |
| 3,005,578 A | 10/1961 | Mainieri |
| 3,129,853 A | 4/1964 | Hoskins |
| 3,130,874 A | 4/1964 | Bulmer |
| 3,179,303 A | 4/1965 | Dankoff et al. |
| 3,201,009 A | 8/1965 | Smith |
| 3,207,371 A | 9/1965 | Stone |
| 3,211,334 A | 10/1965 | McShea |
| 3,308,995 A | 3/1967 | Lee et al. |
| 3,327,905 A | 6/1967 | Gould |
| 3,446,403 A | 5/1969 | Serio |
| 3,512,681 A | 5/1970 | Frankel |
| 3,893,592 A | 7/1975 | Friedman |
| 4,164,301 A * | 8/1979 | Thayer | ................. 220/253 |

(Continued)

*Primary Examiner*—Kevin P Shaver
*Assistant Examiner*—Stephanie E Tyler
(74) *Attorney, Agent, or Firm*—Rosenberg, Klein & Lee (57) ABSTRACT

A dispensing apparatus (10) includes a container unit (100) and a measuring unit (200) coupled to be angularly displaceable one relative to the other between at least open and closed positions. The container unit (100) includes a base (110) and a first partition (122) substantially enclosing a storage compartment (1100). The first partition (122) is formed with an access opening (1220) communicating with the storage compartment (1100). The measuring unit (200) includes a capsule (210) and a second partition (220) substantially enclosing a metering compartment (2100). The second partition (220) is formed with an access opening (2220) at least partially aligning with the access opening (1220) of the first partition (122) in the open position, whereby a predetermined quantity of material may be displaced into the metering compartment (2100) for subsequent dispensation.

8 Claims, 6 Drawing Sheets

U.S. PATENT DOCUMENTS

| | | | |
|---|---|---|---|
| 4,322,017 A | 3/1982 | Lowdermilk | |
| 4,345,700 A | 8/1982 | Souza | |
| 4,346,823 A | 8/1982 | Eppenbach | |
| 4,560,092 A | 12/1985 | Souza | |
| 4,832,235 A | 5/1989 | Palmer | |
| 4,961,521 A | 10/1990 | Eckman | |
| 5,271,535 A | 12/1993 | Fridman et al. | |
| 5,465,871 A * | 11/1995 | Robbins, III | 222/23 |
| 5,495,962 A * | 3/1996 | Nomura | 222/80 |
| 5,588,563 A * | 12/1996 | Liu | 222/158 |
| 5,601,213 A | 2/1997 | Daniello | |
| 5,667,109 A * | 9/1997 | Yu-Mei | 222/456 |
| 5,758,803 A | 6/1998 | Liao et al. | |
| 5,772,086 A * | 6/1998 | Krafft | 222/438 |
| 6,283,339 B1 * | 9/2001 | Morrow | 222/452 |
| 6,550,640 B2 | 4/2003 | Smith | |
| 6,601,734 B1 | 8/2003 | Smith | |
| 6,948,641 B1 * | 9/2005 | Williams | 222/456 |

\* cited by examiner

APPARATUS FOR METERED DISPENSING OF PARTICULATE MATERIALS

BACKGROUND OF THE INVENTION

Field of the Invention

The subject dispensing apparatus is generally directed to an apparatus for storing and dispensing therefrom metered portions of a powder or other particular material. More specifically, the dispensing apparatus is one which is quickly and conveniently reconfigurable in such manner as to permit reliable storage and portioning of the material for subsequent dispensation in predetermined batches.

The need is found in many applications to store a material in a bulk quantity for later dispensation in particular metered portions is found. An exemplary application is that of portably storing and dispensing such dry particulate materials as powdered baby formula. Typically in this context, ample quantities of baby formula are stored and carried by parents of infants in a concentrated dry powder form from which a batch may be taken and mixed with warm water or other liquid immediately prior each feeding. For obvious nutritional and other health reasons, reasonably accurate portioning of the powdered formula to be mixed is important.

This is particularly so given the general vulnerabilities and tendencies of infants. Improper portioning may not only lead to adverse physical reactions upon ingestion, the disproportionate mixture which results may prove sufficiently unpalatable to keep even a moderately finicky infant from feeding, altogether.

Reasonably accurate portioning may be ensured, of course, by carefully mixing the formula beforehand in precisely pre-mixed, ready-to-feed batches. This is often impractical for a number of reasons, however. First, the added weight of the liquid pre-mixed batches would be considerable, as would their added bulk, and the additional number of the containers their separate storage would require. Second, the lack of freshness, and even perishability, of pre-mixed batches becomes a real consideration and may necessitate yet even more extraneous items (in the form of requisite ice packs, coolers, and the like) for preserving freshness. These and other considerations render the pre-mixing of ready-to-feed formula batches an abundantly impractical option in many cases.

Consequently, parents of nursing-age infants often find themselves having to prepare the batches of formula impromptu, as the infant's feeding time arises. Of course, proper portioning may be achieved by taking very deliberate measures in preparing a batch of formula. Parents almost invariably find themselves rushing and fumbling, though, with the not too indelicate nor simple task of preparing the baby bottle with the appropriate amount of liquid, heating the liquid if necessary, dispensing the condensed formula, measuring out the correct amount, then introducing the measured amount into the prepared liquid for mixing. Not surprisingly, the task of preparing a fresh batch of formula for a feeding becomes a considerable project unto itself, requiring one to devote concerted effort to measure and mix accurately, and to do so without leaving an excessive mess of spilled materials, soiled utensils and vessels, and the like. The situation is exacerbated where one individual must alone fumble with the multiple containers, materials, and implements in this regard while having to concurrently tend to the hungry, and quite likely very irritable, infant.

Hence, there exists a need for a storage apparatus from which a particulate material may be quickly, conveniently, and neatly, yet accurately, dispensed in portioned batches for subsequent use. There exists a need, moreover, for such an apparatus having a simple and inexpensively produced structure, whereby such materials as a baby formula powder may be conveniently dispensed in accurately metered portions for use.

PRIOR ART

Dispensing devices for particulate materials are known in the art. The best prior art known to Applicant includes U.S. Pat. Nos. 6,601,734; 6,550,640; 5,758,803; 5,601,213; 5,271,535; 4,961,521; 4,832,235; 4,560,092; 4,346,823; 4,345,700; 4,322,017; 3,893,592; 3,512,681; 3,446,403; 3,327,905; 3,308,995; 3,211,334; 3,207,371; 3,201,009; 3,179,303; 3,130,874; 3,129,853; 3,005,578; 2,985,343; 2,904,230; 2,887,254; 2,877,937; 2,815,154; 2,636,646; 2,579,388; 2,515,735; 2,393,454; 2,385,677; 2,315,473; 2,211,452; 2,207,395; 2,088,836; 1,291,804; 1,005,130; 928,052; 685,988; 614,646; 582,972; and, 152,909. There are no devices for dispensing a given material in measured batches heretofore known which provides the combination of simplicity, ease of use, and effectiveness provided by the subject dispensing apparatus.

SUMMARY OF THE INVENTION

It is a primary object of the present invention to provide an apparatus for quickly and conveniently dispensing a predetermined amount of a material stored therein.

It is another object of the present invention to provide an apparatus whereby a predetermined amount of a stored particulate material may be quickly and conveniently separated from the remainder of the stored material for dispensation.

It is yet another object of the present invention to provide an apparatus of simple and conveniently usable structure by which a particulate material may be metered with reasonable accuracy for dispensing in a predetermined batch amount.

These and other objects are attained by a metered dispensing apparatus formed in accordance with a preferred embodiment of the present invention. The dispensing apparatus generally includes a container unit and a measuring unit coupled to be angularly displaceable one relative to the other between open and closed positions. The container unit is formed with a base and a first partition substantially enclosing a storage compartment defined thereby, the first partition being formed with an opening communicating with the storage compartment. The measuring unit includes a capsule and a second partition substantially enclosing a metering compartment defined thereby. The second partition opposes the first partition and is formed with an opening communicating with the metering compartment. In the open position, the first and second partition openings are at least partially aligned while in the closed position, the first and second partition openings are offset one from the other. In the open position, a predetermined quantity of material stored in the storage compartment may be displaced through the aligned openings into the metering compartment. This quantity of material may in the closed position then be isolated from the storage compartment for subsequent dispensation.

DETAILED DESCRIPTION OF THE PREFERRED EMBODIMENTS

Turning now to FIGS. 1-6, there is shown one embodiment of the subject dispensing apparatus 10. In this embodiment, dispensing apparatus 10 generally comprises a container unit 100 and a measuring unit 200 coaxially coupled in angularly displaceable manner thereto. Container unit 100 serves in overall concept to store a bulk amount of a certain particulate material such as, for example, a condensed baby formula powder. Measuring unit 200 is angularly displaceable between a plurality of angular positions relative to container unit 100, whereby dispensing apparatus 10 is adjustably configured for operation. Measuring unit 200 serves a metering function whereby it measures out a desired batch amount of the material stored in container 100, then isolates from the material remaining in container 100 for dispensation of just that measured batch of material.

The various operational configurations of dispensing apparatus 10 preferably include at least one wherein measuring unit 200 assumes an open position relative to container unit 100, and at least one other wherein measuring unit 200 assumes a closed position relative to container unit 100. The operational configurations also include in the embodiment shown another wherein measuring unit 200 assumes release position relative to container unit 100. In the open position, measuring and container units 200, 100 are mutually arranged such that the given material may be freely passed between compartments they respectively define, whereas in the closed position, access for such passage of material between the two units 200, 100 is substantially blocked. In the release position, measuring and container units 200, 100 are mutually arranged such that they are freed from locking engagement to be decoupled from one another.

Apparatus 10 enables a user to carry in bulk an ample quantity of the given material to yield numerous batches for later consumption. When needed, a batch of the material may be quickly and neatly measured out by appropriately adjusting measuring unit 200 relative to container unit 100, manipulating apparatus 10 to fill measuring unit 200 with material from container unit 100, resetting measuring unit 200 relative to container unit 100, then releasing the resulting batch of material from just the measuring unit 200. The process may be repeated to dispense subsequent batches of the stored material for consumption.

Figure 1:
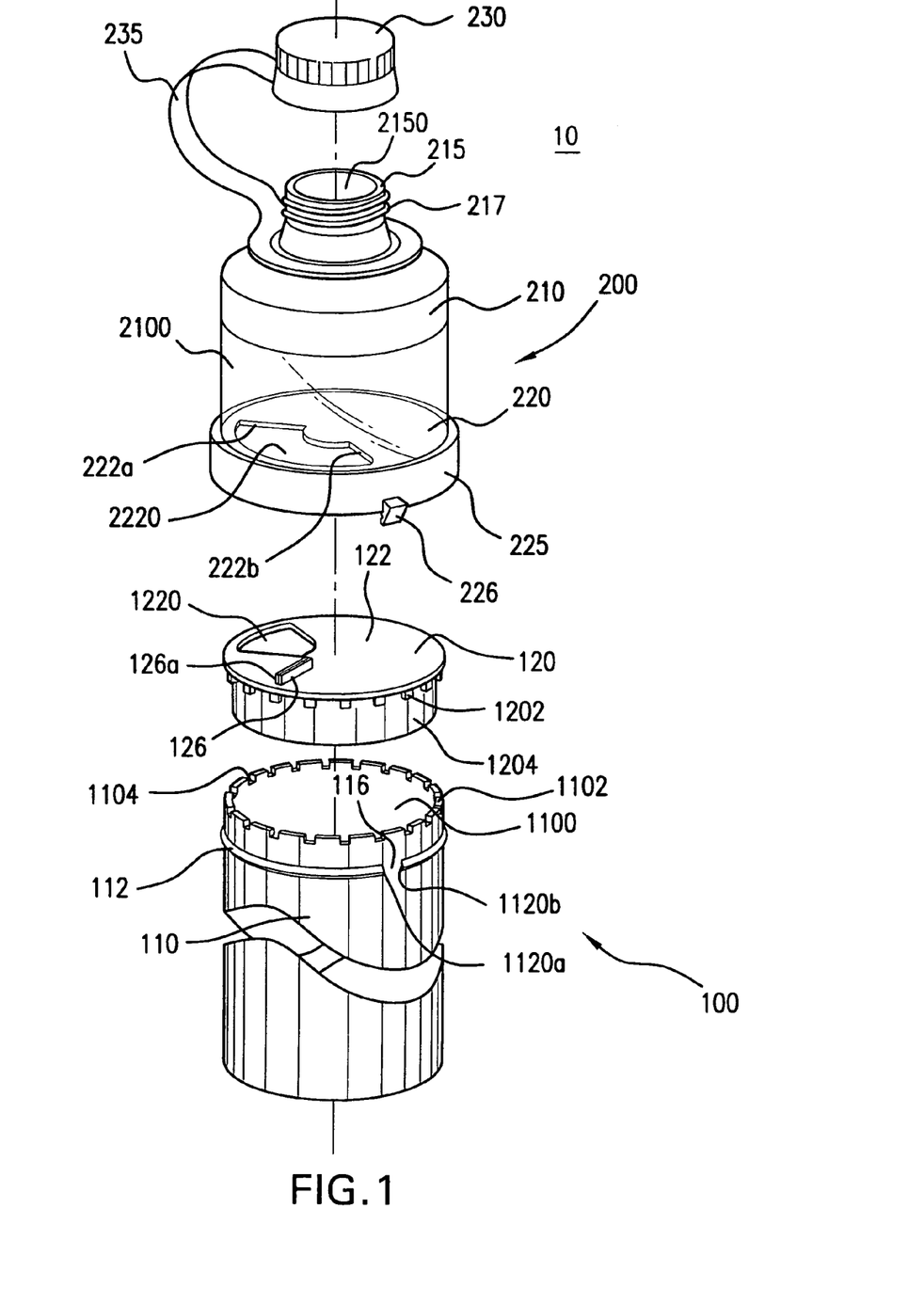
FIG. 1 is an exploded perspective view, partially cut away, of a dispensing apparatus formed in accordance with one embodiment of the present invention.
Figure 2:
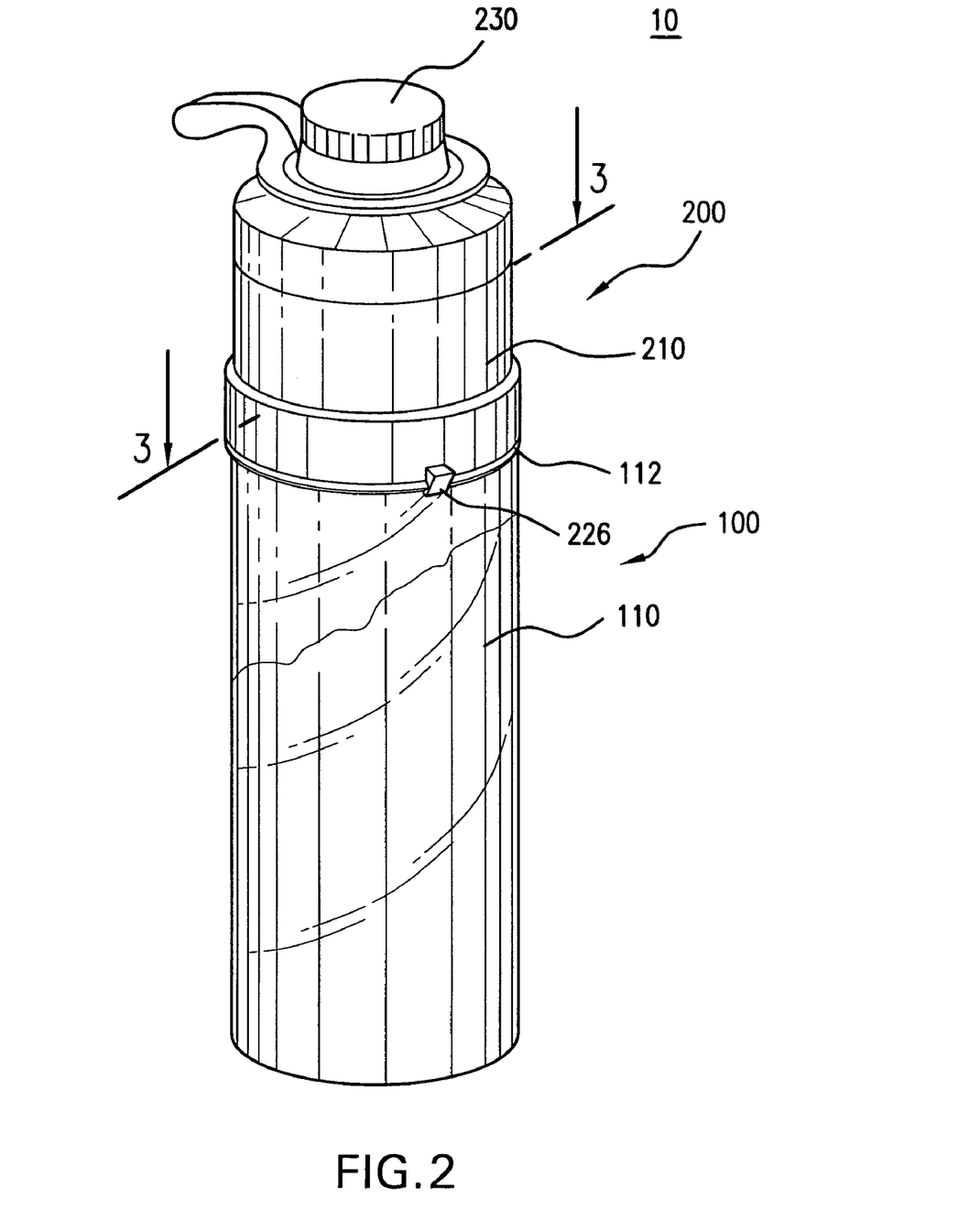
FIG. 2 is an assembled perspective view of the embodiment shown in FIG. 1.

Container unit 100 is formed with a base 110 which defines a storage compartment 1100 for the given material. Container unit 100 includes a partition assembly 120 whose partitioning deck 122 encloses the storage compartment 1100 defined by base 110. This partitioning deck 122 is provided with an opening 1220 which communicates with the storage compartment 1100. Preferably, partition assembly 120 is removably coupled to base 110; however, it may in other embodiments be integrally formed therewith. In the embodiment shown, base 110 is formed with a substantially cylindrical contour open at an upper axial end to permit access to storage compartment 1100. An upper edge 1102 of base 110 is formed preferably with a plurality of notches 1104. These notches 1104 respectively receive a plurality of corresponding engaging bosses 1202 formed on partition assembly 120 when that partition assembly 120 is combined with base 110 to enclose storage compartment 1100. This is but one example of numerous mating or engaging structures which may be suitably employed to enhance the security of coupling where partition assembly 120 is provided in this manner, as a removable closure component for base 110.

Container unit 100 also includes in the embodiment disclosed a rail-like catch portion 112 extending annularly about base 110 from one of its terminal ends 1120a, 1120b to the other. The opposing ends 1120a, 1120b are spaced to define a release slot 116 for breaking, or interrupting, catch portion 112, which preferably forms an otherwise continuous rail-like extension about an outer surface portion of base 110.

Catch portion 112 serves as a catch for a corresponding retaining portion of measuring unit 200 described in following paragraphs, by virtue of which measuring unit 200 is substantially locked against axial displacement from container unit 100. It may be formed with other configurations in alternate embodiments. For instance, where the thickness of the sidewall material for base 110 is sufficient to permit, catch portion 112 may be formed alternatively as a recessed slot defining an angularly extended track-like formation. Suitable measures would then be provided to ensure that the release slot formed between the catch portion's terminal ends provides ample clearance for disengagement of the retaining portion therefrom.

The removable embodiment of partition assembly 120 shown contemplates its functioning much like a cap for base 110. As such, partition assembly 120 may be removed by the user as needed for, among other things, filling, emptying, or cleaning storage compartment 1100. In other embodiments, partition assembly 120 may be integrally formed with base 110 to extend fixedly over storage compartment 1100.

Partition assembly 120 in the illustrative embodiment shown is formed with a substantially planar partitioning deck 122 in which a preferably wedge-shaped access opening 1220 is formed to enable open access to storage compartment 1100. Partition assembly 120 is also formed in the embodiment illustrated with a substantially tubular skirt portion extending axially downward from partitioning deck 122. The outer periphery of partitioning deck 122 extends radially beyond skirt portion 1204 to form a flange-like rim, such that when partition assembly 120 is fitted to base 110, the rim comes to rest upon the portion 1102 of base 110, while skirt portion 1204 telescopically engages the corresponding inner surface thereof. Preferably, a plurality of engaging bosses 1202 are protrusively formed on skirt portion 1204 immediately beneath the rim portion defined by partitioning deck 122, for engaging respective notches 1104 formed in the base's edge portion 1102. Partition assembly 120 may be securely interlocked thereby with base 110.

Note that all or part of partition assembly 120 may be formed alternatively as pre-assembled components of measuring unit 200 in other embodiments. In that case, measuring unit 200 would serve a capping as well as a measuring/dispensing function for container unit 100. Suitable measures would be taken to ensure that partitioning deck 122 remains securely interlocked with base 110, so as to remain stationary while other components of measuring unit 200 are angularly displaced relative to measuring unit 100 in adjusting the operational configuration of apparatus 10.

While not shown, partition assembly 120 may also be formed with a shaft member extending axially from a central portion of partitioning deck 122, if necessary. This shaft member would engage an axial opening (not shown) correspondingly formed in the supplemental portioning deck 220 of measuring unit 200 to reinforce and stabilize the angularly displaceable, coaxially aligned coupling of measuring unit 200 to partition assembly 120. With the features employed in the illustrative embodiment shown, such engagement reinforcing structure will likely be unnecessary in most applications.

Partition assembly 120 preferably includes as well a stop 126 protruding from partitioning deck 122. This stop 126 is suitably positioned relative to 1220 so as to limit the angular displacement of measuring unit 200 relative to container unit 100. Preferably, stop 126 includes a deflective resilient portion 126a disposed along a leading face thereof.

Container unit 100 may be formed of any suitable material known in the art appropriate for the specific requirements of the intended Application. In baby formula powder dispensing applications, for example, such materials like plastic, Pyrex, stainless steel, or other materials of suitable strength, rigidity, and durability required for the application may be employed. In baby product applications, other considerations such as thermal expansion properties and the ability to withstand a wide range of temperatures may be of particular significance, given such common practices of parents as sterilizing vessels and implements by immersing in boiling water. Nevertheless, the particular choice of material(s) actually employed is not important to the present invention.

Any suitably deflective material known in the art may be employed for resilient portion 126a of stop 126. Preferably, resilient portion 126a is formed of a high density foam material that is relatively firm, yet deflects with suitable responsiveness substantially in proportion to the force applied thereto. Resilient portion 126a would provide a tactile abutment for measuring unit 200, then provide discernible resistance as it deflects to accommodate the measuring unit's advanced displacement beyond the initial point of abutment.

Measuring unit 200 includes a capsule 210 extending over a supplemental partitioning deck 220 to define a metering, or measuring, compartment 2100 therein. Capsule 210 may be formed with any suitable contour necessary to yield a predetermined volumetric capacity for metering compartment 2100. Capsule 210 is formed with an outlet 215 which defines a dispensing opening 2150 disposed in open communication with metering compartment 2100. A closure 230 is provided for closing this dispensing opening 2150, preferably by matedly engaging threads 217 formed about outlet portion 215. This closure 230 is preferably retained with measuring unit 200 by a tether 235 of any suitable configuration known in the art for ease and convenience of use.

Supplemental partitioning deck 220 provides a partial floor for metering compartment 2100. It is preferably formed with a wedge-shaped access opening 2220 radially offset from its axial center. When measuring unit 200 is coupled to partition assembly 120 of measuring unit 100, supplemental partitioning deck 220 is disposed in substantially overlaid manner over partitioning deck 122, preferably in coaxially rotatable manner relative thereto. Depending on the angular position of measuring unit 200 relative to partition assembly 120, access opening 2220 may or may not align with some portion of access opening 1220 below. Access openings 2220 and 1220 are preferably so contoured, dimensioned, and situated at their respective partitioning decks that when measuring unit 200 is in an open position relative to container unit 100, at least a portion of the two access openings 2220, 1220 are aligned to permit open communication between storage and metering compartments 1100, 2100 therethrough. When measuring unit 200 is disposed in its closed position relative to container unit 100, on the other hand, the two access openings 2220, 1220 are fully offset from one another to each be blocked by the other's partitioning deck 122, 220. Storage and metering compartments 1100, 2100 are then effectively partitioned and isolated one from the other.

Measuring unit 200 includes in the given embodiment a retaining portion 226 extending from a periphery 225 of partitioning deck 220. Such retaining portion 226 is suitably configured with a catching, or hooking, type configuration for retentively engaging catch portion 112 of container unit 100. Preferably, the retentive engagement is also a slideable engagement serving not only to lock the coupling of measuring unit 200 to container unit 100, but also to guide its angular displacement thereabout.

Retaining portion 226 is suitably configured and dimensioned to be freed from engagement with catch portion 112 when positioned squarely within release slot 116. A release position is preferably defined thereby for measuring unit 200 relative to container unit 100, where measuring unit 200 is released for decoupling from container unit 100.

Preferably, one of the access openings 2220, 1220 is formed to be greater in size than the other, with stop 126 being formed on the opposing partitioning deck to extend therefrom into the larger access opening. In the embodiment illustrated, access opening 2220 of the measuring unit's partitioning deck 220 is formed to be of greater size than access opening 1220 of the other partitioning deck 122; and, stop 126 (with its resilient portion 126a) is formed to protrude upward from that other partitioning deck 122 into access opening 2220.

Figure 4:
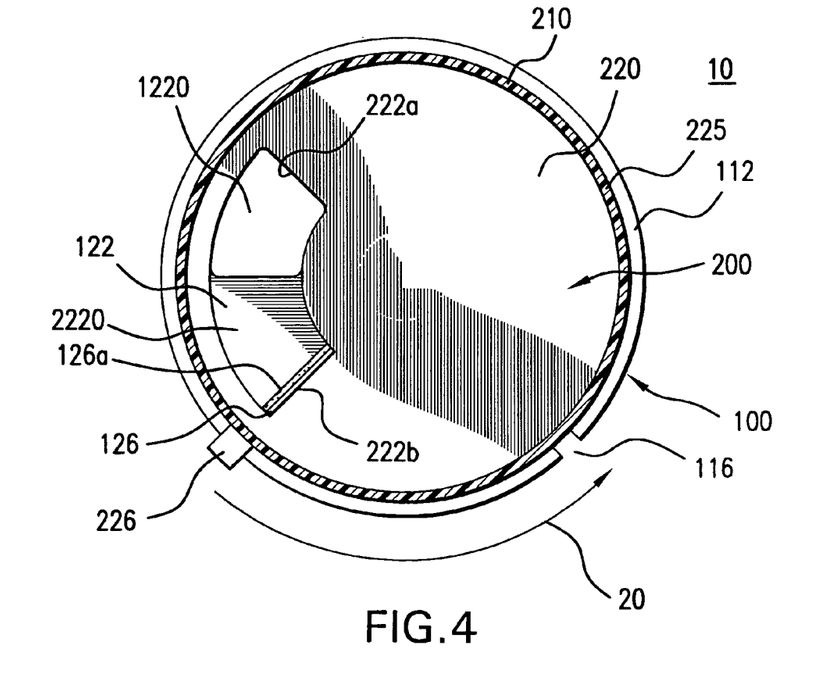
FIG. 4 is a sectional view as shown in FIG. 3, with the apparatus shown in an open configuration.

When measuring unit 200 is in its fully opened position relative to container unit 100 as illustrated in FIG. 4, access opening 2220 preferably overlaps access opening 1220 in its entirety so that access opening 1220 is left unimpeded by any substantial portion of supplemental partitioning deck 220. The stored material may then freely pass from storage compartment 1100 into metering compartment 2100. In metering configuration for apparatus 10 shown, the exposed side of stop 126 (away from resilient portion 126a) serves as a hard, rigid stop for a trailing edge 222b of partitioning deck 220 at opening 2220.

Displacing measuring unit 200 with respect to container unit 100 along the direction indicated by arrow 20 would increasingly block a portion of access opening 1220. A user may thus adjust apparatus 10 to control the rate of material flow permitted through access opening 1220, and do so to the point where access opening 2220 no longer overlaps access opening 1220 and effective isolates the storage and metering compartments 1100, 2100 from one another. Apparatus 10 would then be set in its dispensing configuration.

Figure 3:
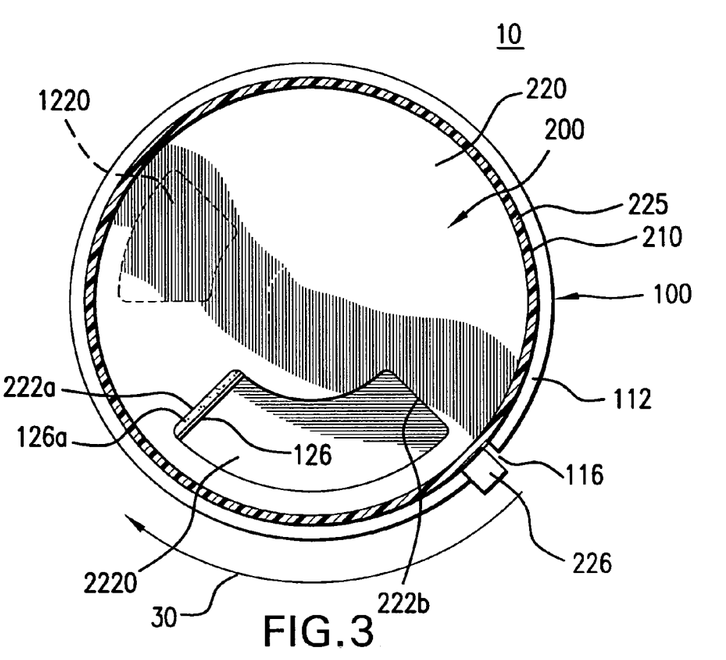
FIG. 3 is a sectional view taken along line 3-3 of FIG. 2, with the apparatus in a closed configuration.

In the fully closed position illustrated in FIG. 3, measuring unit 200 is angularly positioned relative to container unit 100 such that a leading edge 222a of supplemental partitioning deck 220 at its access opening 2220 bears against resilient portion 126a of stop 126. At this point, the measuring unit's retaining portion 226 is disposed near but not fully within release slot 116 of the container unit's catch portion 112, and therefore maintains engagement with that catch portion 112.

A user may then return the apparatus configuration to the dispensing configuration (open position of measuring unit 200) shown in FIG. 4 by turning measuring unit 200 with respect to container unit 100 in the return direction indicated by arrow 30. The stop limits provided by stop 126 and its resilient portion 126a at the open and closed positions enables the user to conveniently reconfigure apparatus 10 between its metering and dispensing configurations without having to check and inspect to ensure sufficient alignment or sufficient offsetting of the access openings 1220, 2220.

Figure 5:
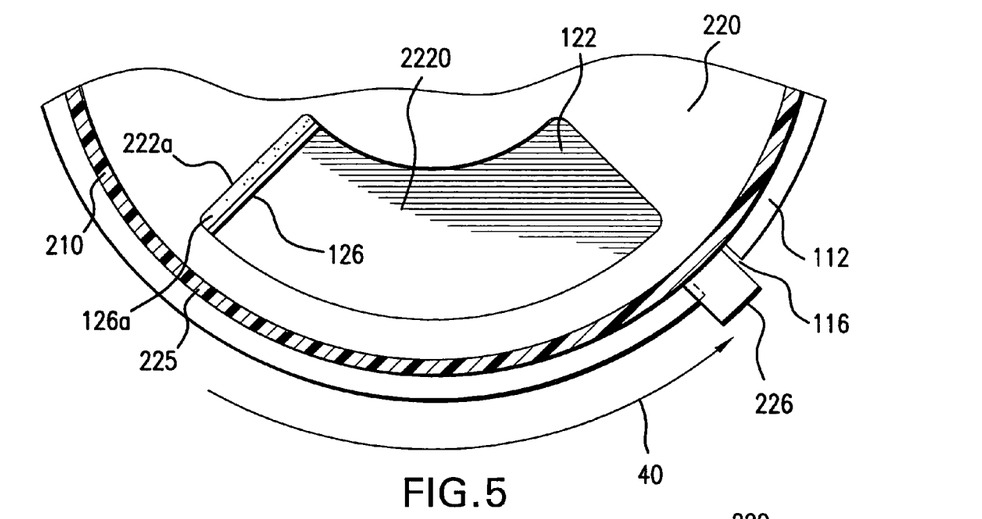
FIG. 5 is an enlarged view, partially cut away, of a portion of the cross-sectional view shown in FIG. 3.
Figure 6:
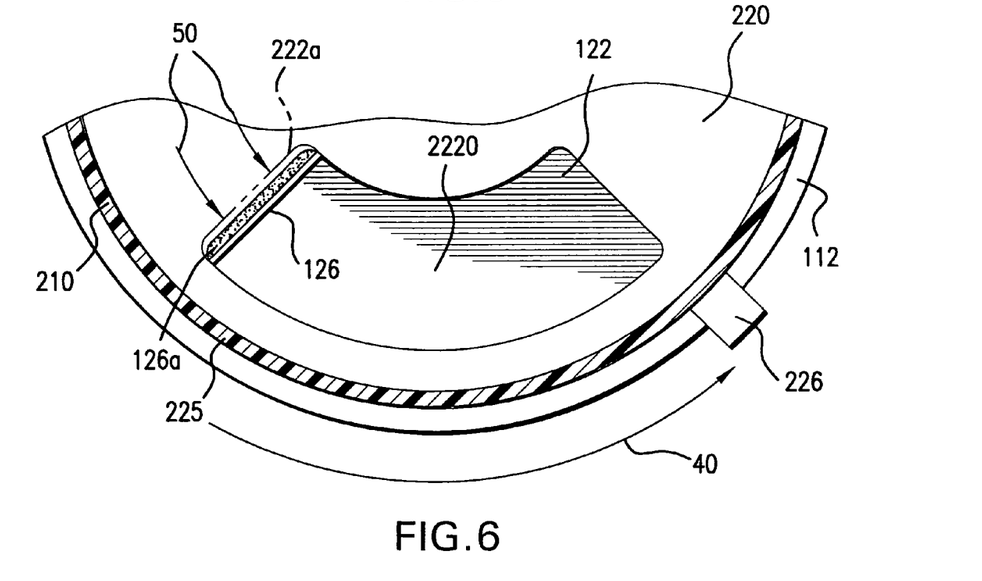
FIG. 6 is an enlarged sectional view of the portion shown in FIG. 5, with the apparatus in a release configuration.

In the closed position shown in FIG. 3, leading edge 222a of supplemental partitioning deck 220 simply abuts the stop's resilient portion 126a, without significantly deflecting it. If, however, a user wishes to remove measuring unit 200 from container unit 100, he/she may in accordance with the illustrative embodiment shown force a further turn along the direction indicated by arrow 40, as illustrated in FIGS. 5-6. This causes leading edge 222a to impart a deflective force upon resilient portion 126a, as indicated by arrows 50. The responsive deflection of resilient portion 126a yields the additional displacement of measuring unit 200 along the direction 40 sufficient to position retaining portion 226 fully within release slot 116. Measuring unit 200 is then freed for removal from container unit 100.

Much like container unit 100, measuring unit 200 may be formed of any material known in the art suitable for the intended application. A plastic, Plexiglas, steel, or other such materials of sufficient strength, rigidity, and durability for the intended application may be employed for the various parts of measuring unit 200. Thermal properties may be of particular concern in the baby formula dispensing application of the embodiment shown.

At least a portion of capsule 210 is preferably formed of a transparent material in the embodiment shown to enable a user's visual confirmation that capsule 210 has been filled to capacity with material passed from the storage compartment 1100 of the container unit's base 110, for instance. Likewise, at least a portion of base 110 is preferably formed of a transparent material to enable the user's visual confirmation of the amount of material remaining within storage compartment 1100 of that base 110.

In use, a user may conveniently remove partition assembly 120 from base 110 to fill storage compartment 1100 with a suitable amount of condensed baby formula powder or other particulate material. The user may in the alternative fill storage compartment 1100 simply through access opening 1220 without removing partition 120 from base 110, though it may take more time and effort to do. The user would thereafter assemble unit 10 by aligning retaining portion 226 with release slot 116, then turning measuring unit 200 about its axis, relative to container unit 100. Retaining portion 226 then slides into engagement with catch portion 112 such that measuring unit 200 may be conveniently turned between open and closed positions with respect to container unit 100.

When the time then comes to dispense a batch of the stored material for use, the user simply configures apparatus 10 to place measuring unit 200 in its open position, whereafter apparatus 10 is upended, shaken, or otherwise manipulated to urge a portion of the stored material into the metering compartment 2100 of capsule 210. When metering compartment 2100 is substantially filled to capacity, apparatus 10 is again reconfigured to place measuring unit 200 in its closed position, fully partitioning the batch of material so metered within metering compartment 2100 from the storage compartment 1100. The user may then remove closure 230 and dispense the metered batch of material through dispensing opening 2150 of outlet 215. Upon replacement of closure 230, the process may be quickly and conveniently repeated to dispense additional batches of the stored material.

Figure 7:
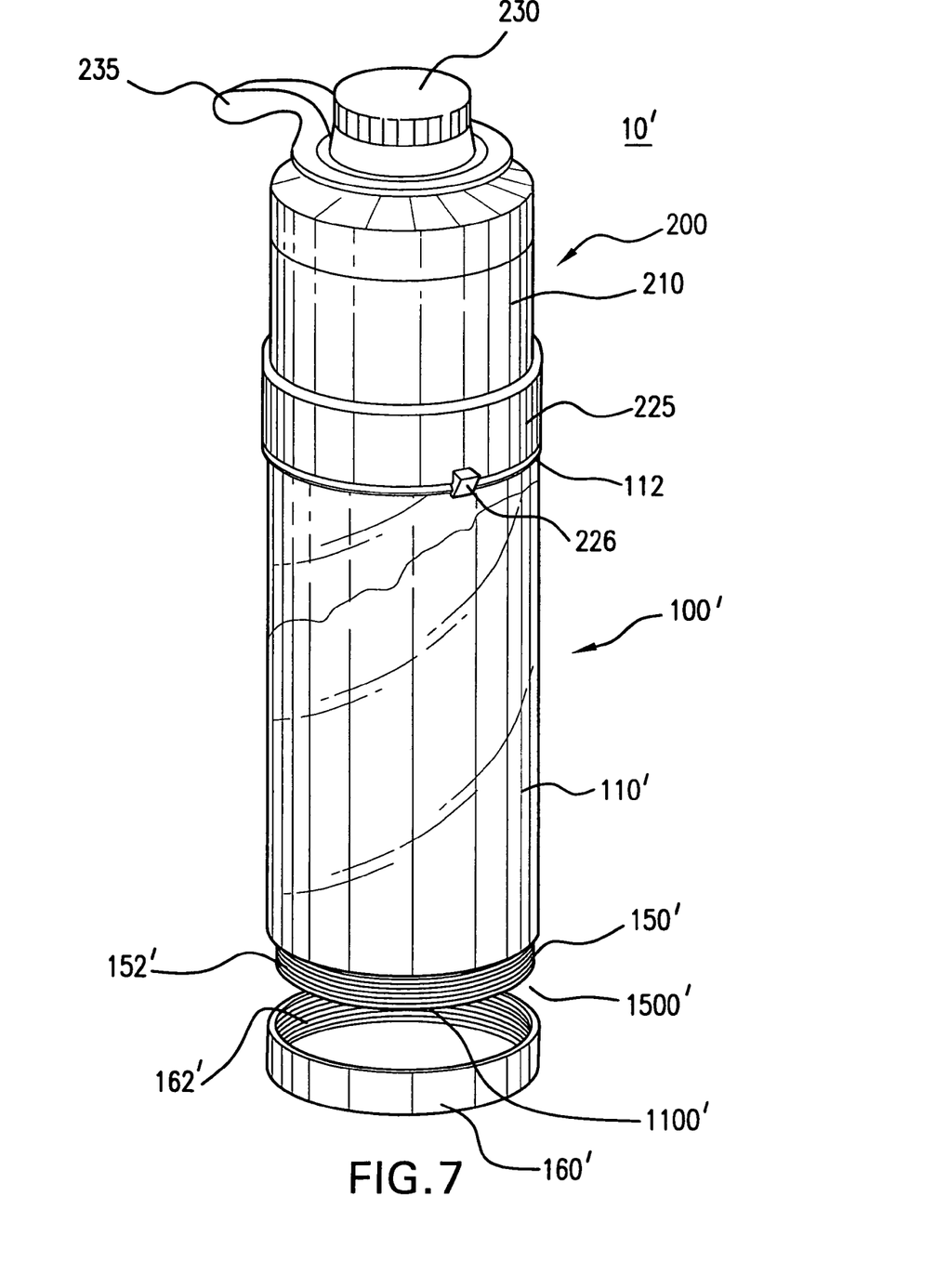
FIG. 7 is a partially exploded perspective view of the assembled apparatus in accordance with an alternate embodiment of the present invention.

Turning now to FIG. 7, there is shown a dispensing apparatus 10' formed in accordance with an alternate embodiment of the present invention. In that embodiment, container unit 100' includes a base 110' having a lower terminal end 150' which defines a fill opening 1500'. This fill opening 1500' serves to provide open access to a storage compartment 1100'. Fill opening 1500' may be closed off during use by a removable end cap 160', for which suitable fastening means such as corresponding threads 152', 162' may be employed to releasably fasten end cap 160' to terminal end 150'.

The resulting structure permits a user to easily fill and empty storage compartment 1100' of container unit 100'. It enables the user to do so very conveniently, without having to detach measuring unit 200 from container unit 100'.

Figure 8:
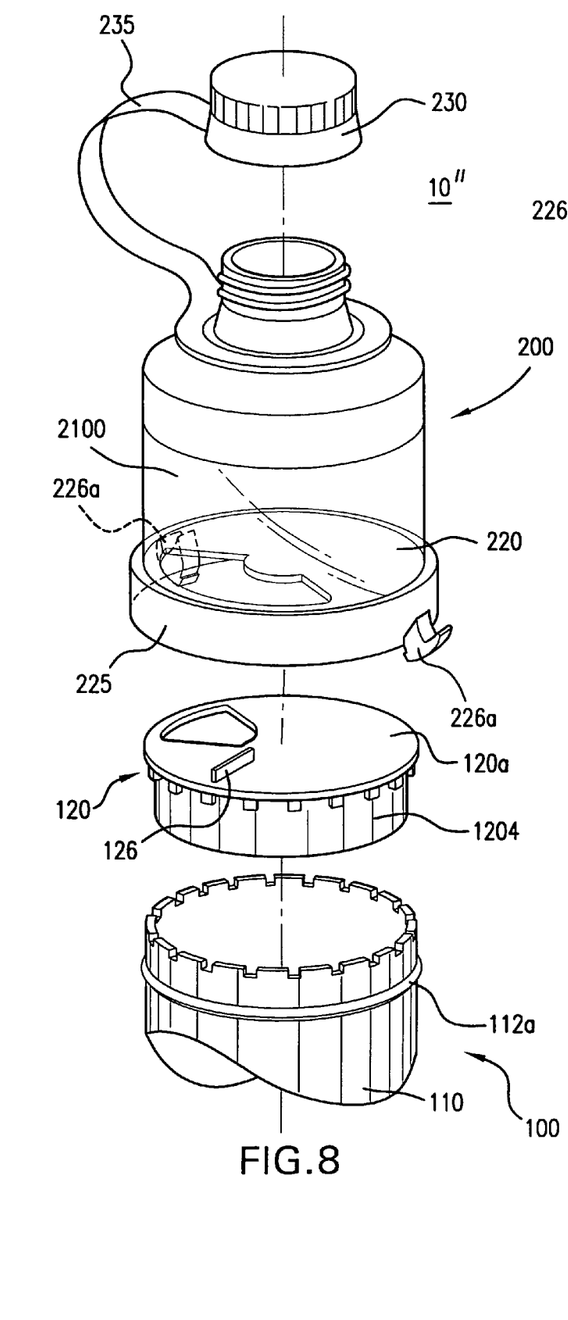
FIG. 8 is an exploded perspective view, partially cut away, of a dispensing apparatus formed in accordance with another alternate embodiment of the present invention.

Turning to FIG. 8, there is shown a dispensing apparatus 10" formed in accordance with another alternate embodiment of the present invention. In this embodiment, one or more retaining portions 226a are provided on the periphery 225 of partitioning deck 220 with a sufficiently resilient structure to effect snap-fit engagement of catch portion 112a extending about the container unit's base 110. This snap-fit engagement obviates the release slot 116 which interrupts the catch portion 112 in the embodiments described in preceding paragraphs. It also obviates the need for any deflective portion at stop 126 of partition assembly 120, as retaining portions 226a need not be aligned with any particular part of catch portion 112a in order for engagement or disengagement to be effected.

Figure 9:
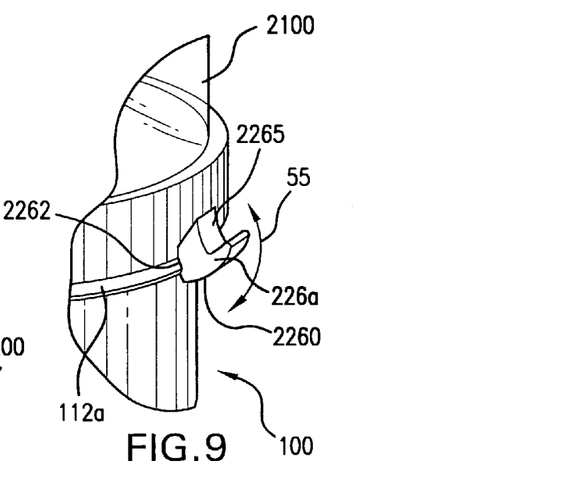
FIG. 9 is an enlarged view of a portion of the embodiment shown in FIG. 8 when fully assembled.

FIG. 9 illustrates the snap fit engagement structure in more detail. As illustrated, each retaining portion 226a is formed in this embodiment with an inclined pressing surface 2260 against which a user may press to cause at least a deflection of retaining portion 226a upwards along the direction indicated by the bidirectional arrow 50 to urge that retaining portion's release from the protrusive catch portion 112a. Upon release, retaining portion 226a would return to its undeflected configuration, downward along the arrow 50. Conversely, when retaining portion 226a is to be placed into engagement with catch portion 112a, an axially downward depression force would cause retaining portion 226a to bear against catch portion 112a and deflect upward along arrow 50 until latching surface 2262 snaps in position over catch portion 112a.

Preferably, a lever extension 2265 is formed to serve as an extension of pressing surface 2260 which enables the user to apply greater leverage in deflecting retaining portion 226a towards disengagement from catch portion 112a. Such lever extension 2265 may or may not be provided, depending on the particularities of the given embodiment and application. Where it is provided, any suitable structure may be employed, preferably with configurational features which minimize or altogether eliminate the potential for snagging bags, clothing, and the like.

Figure 9A:
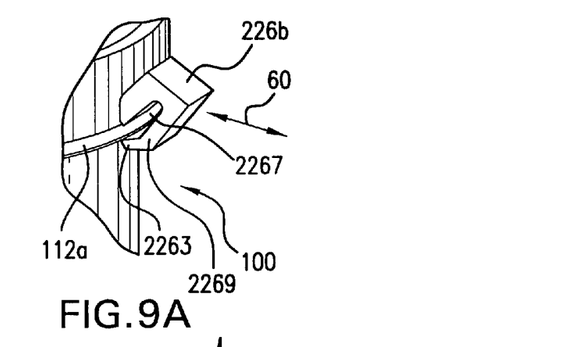
FIG. 9A is a corresponding perspective view of an alternate embodiment of the portion shown enlarged in FIG. 9; and, FIG. 9B is a corresponding perspective view of yet another alternate embodiment of the portion shown enlarged in FIG. 9.

Referring to FIG. 9A, there is shown another embodiment wherein at least one retaining portion shown in FIGS. 8 and 9 is formed with an extended internal notch structure to yield enhanced deflective resilience in the resulting retaining portion 226b. As shown, an internal notch 2267 extends inward from a latching end 2263 of retaining portion 226b to define a latching arm 2269 suitably deflectable substantially along the direction indicated by bidirectional arrow 60. Again, retaining portion 226b may be placed into engagement with catch portion 112a simply by snap-fitting accordingly. The deflective structure of latching arm 2269 is such that disengagement may be effected either by forcefully drawing measuring unit 200 axially apart from container unit 100 or, more directly, by the user's gripping and prying each latching arm 2269 away from catch portion 112a along the radially outward direction indicated by arrow 60 to clear latching end 2263 from catch portion 112a to free the measuring unit for removal. Any suitable internally extended notch, or cut out, configuration other than that illustrated may be similarly employed in other embodiments. An advantage of such internally cut out structure is the minimized propensity of the resulting retaining portion to snag an external component.

Figure 9B:
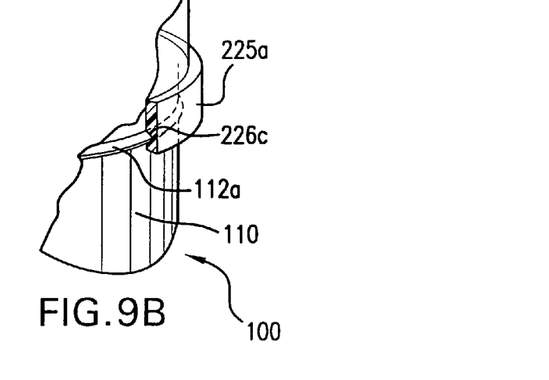

Turning next to FIG. 9B, there is illustrated still another alternate embodiment wherein an annular notch, or groove, 226c is formed into an internal surface of the partitioning deck's peripheral wall 225a. Depending on the particularities of the given embodiment and application, this annular notch 226c may either substitute for or supplement the retaining portion/catch portion engagement described in preceding paragraphs for various illustrative embodiments. Where employed as a supplement to one or more retaining portions 226, 226a, 226b, an additional catch portion 112, 112a may be necessary, although not shown in FIG. 9B. The peripheral wall 225a in this embodiment is formed with sufficient deflective resilience to accommodate snap-fit engagement and/or disengagement with/from catch portion 112a. Where the materials employed make disengagement difficult, the embodiment of FIG. 7 providing for a removable end cap 160' for container unit 100' may be particularly useful to enable convenient access to that container unit without frequent disassembly of measuring unit 200 therefrom.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular combinations of disclosed steps may be reversed or interposed, all without departing from the spirit or scope of the invention as defined in the appended claims.

What is claimed is:

1. An apparatus for storing and dispensing powdered baby formula comprising:
    a container unit having a base and a first partition substantially enclosing a storage compartment defined thereby, said first partition having formed therein an opening communicating with said storage compartment;
    a measuring unit coaxially coupled in angularly displaceable manner to said container unit, said measuring unit including a capsule and a second partition substantially enclosing a metering compartment defined thereby, at least a portion of said capsule being formed of a substantially transparent material, said second partition being disposed over said first partition and having formed therein an opening communicating with said metering compartment;
    at least one of said first and second partitions including a stop protruding therefrom to extend into said opening of the other of said first and second partitions;
    said container and measuring units being angularly displaceable one relative to the other between open and closed positions, said first and second partition openings being at least partially aligned in said open position, and offset one from the other in said closed position;
    whereby a predetermined quantity of material stored in said storage compartment may be displaced into said metering compartment in said open position, and isolated from said storage compartment in said closed position for subsequent dispensation;
    wherein said measuring unit is snap-fit coupled to said container unit; and, said base includes a catch portion extending annularly thereabout, first and second terminal ends of said catch portion defining on said base a release slot; and, said measuring unit includes a protrusive retaining portion for slidably engaging said catch portion in said open and closed positions and being disengaged from said catch portion in said release position.

2. The metered dispensing apparatus as recited in claim 1 wherein said stop includes a resilient portion for deflectively limiting angular displacement of said first and second partitions one relative to the other.

3. The metered dispensing apparatus as recited in claim 2 wherein said measuring unit is angularly displaceable to a release position angularly offset from said closed position substantially by the extent of deflection of said resilient portion of said stop.

4. The metered dispensing apparatus as recited in claim 1 wherein said measuring unit includes a closable dispensing opening formed on said capsule.

5. The metered dispensing apparatus as recited in claim 1 wherein said first partition is removably coupled to said base.

6. The metered dispensing apparatus as recited in claim 1 wherein said measuring unit includes a peripheral wall extending axially from said second partition, said peripheral wall having a groove formed therein for retentively engaging said protrusive catch portion of said container unit.

7. The metered dispensing apparatus as recited in claim 1 wherein said retaining portion includes a lever extension for leveraging deflective manipulation by a user.

8. The metered dispensing apparatus as recited in claim 1 wherein said retaining portion is formed with an internally extending notch for deflective resilience.

* * * * *